Jan. 17, 1961
H. B. SCHULTZ
2,968,316
POWER STEERING VALVE
Filed March 5, 1956
2 Sheets-Sheet 1
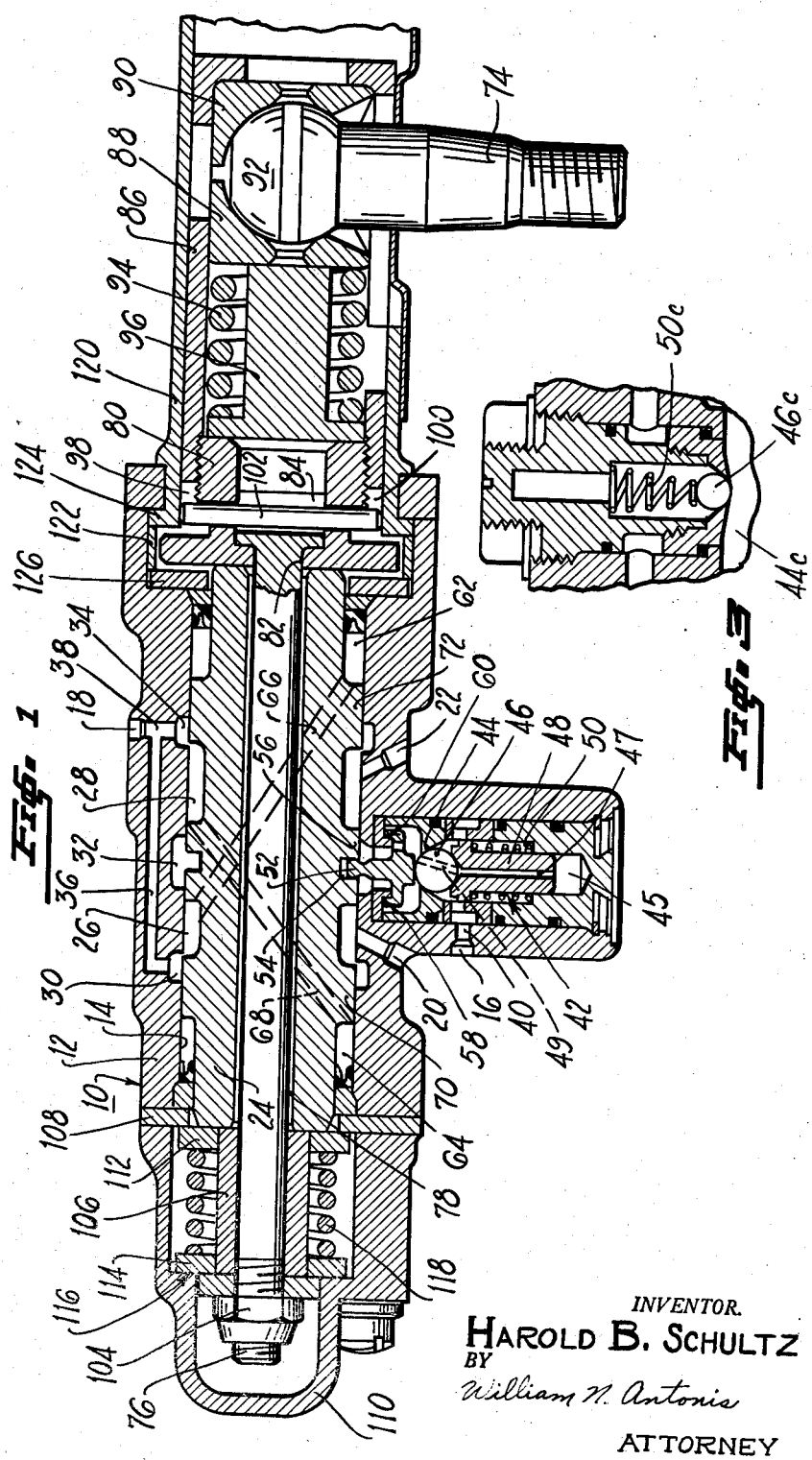
INVENTOR.
HAROLD B. SCHULTZ
BY
William N. Antonis
ATTORNEY

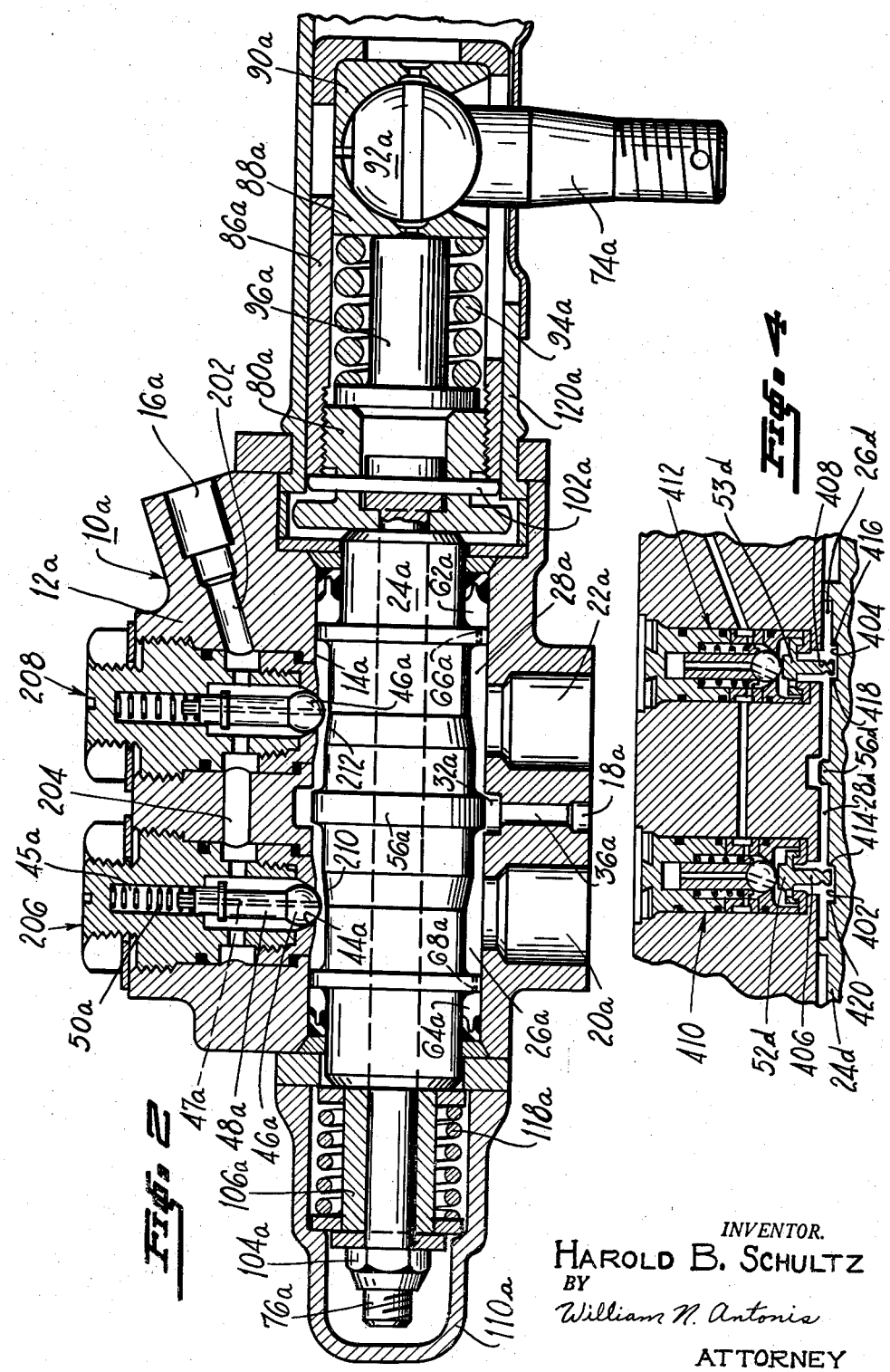

United States Patent Office 2,968,316
Patented Jan. 17, 1961

2,968,316

POWER STEERING VALVE

Harold B. Schultz, South Bend, Ind., assignor to The Bendix Corporation, a corporation of Delaware Filed Mar. 5, 1956, Ser. No. 569,383

7 Claims. (Cl. 137—622)

The present invention relates to power steering, and more specifically to a power steering control valve for use with an accumulator system.

While a spool valve is simple and very satisfactory for an open center system, it has been found to be quite unsuitable for a closed center installation because it does not seal positively. A leaky valve cannot be tolerated in a closed center system since it tends to reduce the pressure in the accumulator and will, therefore, require the expenditure of energy to keep the pressure up, this energy being wasted. Furthermore, in a central hydraulic system, accumulator leak down with the vehicle standing will leave no stored pressure available for brake applications before the engine has been started and the accumulator charged again.

It is therefore an object of this invention to provide a closed central control valve which retains most of the advantages and simplicity of a spool valve but which permits no accumulator leakage in the centered position.

Another object of this invention is to provide a closed center control valve which is sensitive and quick acting.

A further object of this invention is to provide a closed center control valve which is made up of parts which can be easily and economically manufactured and assembled.

A still further object of this invention is to provide a control valve which uses a spool valve for distribution porting but which incorporates poppet valve elements to control pressure admission.

The above and other objects and features of the invention will become apparent from the following description of the device taken in connection with the accompanying drawings which form a part of this specification and in which:

Figure 1 is a view in section of a novel closed center control valve having a single poppet valve;

Figure 2 is a view in section of a novel closed center control valve having double poppet valves;

Figure 3 is a fragmentary section of a modified form of poppet valve; and

Figure 4 is a fragmentary section of a modification of the control valve shown in Figure 2.

Referring to Figure 1 of the drawings, numeral 10 designates a closed center control valve which is intended to be used in a hydraulic system which includes a reservoir, a pump, a pressure regulator, an accumulator and a power steering cylinder, none of which are shown. The control valve includes a housing member 12 having a bore 14 therein, an inlet port 16, an outlet port 18, and cylinder ports 20 and 22. These ports may be suitably connected to an accumulator, reservoir and power cylinder as is commonly known in the art. A valve member 24 lies within bore 14 and is movable in opposite directions from a normally neutral or center position. The valve member is formed with two annular channels 26 and 28 which communicate with cylinder ports 20 and 22, respectively. The bore 14 of the housing member is provided with annular channels 30, 32, and 34. Annular channels 30 and 34 communicate with the outlet port 18 via passages 36 and 38. Annular channel 32 communicates with the inlet port 16 via passage 40 and poppet valve 42. The poppet valve includes a valve seat 44, a ball valve 46 with a plunger 48 welded thereto and a preloaded spring 50 urging said ball valve against said valve seat. In order that the poppet valve be hydraulically balanced, the effective seating area of the ball valve 46 on the valve seat 44 is made equal to the cross-sectional area of the valve plunger 48, and communication is established between chamber 45 and annular channel 32 via passages 47 and 49. A T-section collar button actuating member 52 which rides in recess 54 of center land 56 is capable of unseating ball valve 46 by pivoting about edge 58 or edge 60 depending on the direction of movement of the valve member 24.

Reaction chambers 62 and 64 communicate with the cylinder ports 26 and 28 via passages 66 and 68. The pressure in these reaction chambers opposes relative movement of the valve member away from its neutral or center position by exerting a force against the faces of the outer lands 70 and 72. This force, which is in the form of a reaction force, is transmitted to the operator of the control valve through ball stud 74.

The valve member 24 is operatively connected to the ball stud 74 for sliding movement in the bore 14, through an assembly of parts comprising a bolt 76, extending through a central passage 78 of the valve member, a stop bushing 80 having an opening 82 therein which passes the small diameter of the bolt but not the enlarged end 84, an inner sleeve 86 the inner end of which threadedly engages the stop bushing 80, members 88 and 90 providing sockets for a spherical end 92 of the stud, a spring 94, and a ball socket member 96 which abuts stop bushing 80. The inner end of the sleeve 86 is slotted at 98 and 100 to receive the ends of pin 102, thereby preventing rotation of the assembly in the bore. The pin 102 passes through the stop bushing 80 and enlarged end 84 of the bolt 76 in order to prevent the latter from turning when the nut 104 is applied thereto. Between the valve member 24 and the nut 104 is a spacer sleeve 106. A stop ring 108 is fixed between the valve housing 12 and endcap 110 so that valve member 24 may move with respect thereto. Retaining ring 112 which abuts the stop ring 108 and retaining ring 114 which abuts a shoulder 116 within the endcap 110 confine a preloaded centering spring 118. With nut 104 tightened down against the spacer sleeve 106, movement of the ball stud will cause the valve member and assembly to move as a unit within the outer sleeve 120, valve housing 12, and endcap 110.

Note that stop bushing 80 has a radially extending flange 122 which engages the inner end 124 of the sleeve 86 when the valve member is moved to the right as viewed in Figure 1 and the outer side of the bushing 126 when the valve member is moved to the left. This positive engagement between the stop bushing and the surrounding structure after a predetermined movement of the valve member permits manual steering in the event of power failure.

Figure 1 of the drawings shows the control valve in its neutral or center position. In this position fluid flow from the inlet port to the central annular channel 32 is prevented since the poppet valve 42 is closed. However, provision is made for the free flow of fluid between the chambers of the power cylinder (not shown) as long as the power fluid is not being employed, such free communication being automatically cut off whenever the control valve is operated to admit power fluid into either of the cylinder chambers. Thus, in the neutral position cylinder channel 26 communicates with return channel 30 and cylinder channel 38 communicates with return channel 34. Note also that in the neutral position the center land 56 laps the edges of the central annular channel 32. Movement of valve member 24 to the left will cause the collar button actuating member 52 to pivot about edge 60 thereby unseating ball valve 46 from the valve seat 44. Movement of the valve member to the right will also result in the unseating of ball valve 46 since the actuating member 52 will now pivot about edge 58. The width of the central land 56 is proportioned so that the ball valve 46 will be unseated before annular channel 32 communicates with the cylinder channels 26 or 28, depending on the direction of movement of the valve member 24. In order to prevent loss of power through the escape of pressure fluid, the channel of free communication between the cylinder chambers is cut off before pressurized fluid enters the annular channels of the valve member. Thus, if the valve member were moving to the left, cylinder channel 28 would cease to communicate with return channel 34 before pressurized fluid from the inlet port 16 entered the cylinder channel 28.

Figure 2 of the drawings shows a second embodiment of a closed center control valve which may also be used in an accumulator system. In this figure, parts corresponding to those already described in connection with the embodiment of Figure 1 are given the same numeral with the subscript *a* affixed thereto. The control valve 10a includes a housing member 12a having a bore 14a therein, an inlet port 16a, an outlet port 18a, and cylinder ports 20a and 22a. A valve member 24a lies within the bore 14a and is movable in opposite directions from a normally neutral or center position. The valve member is formed with two annular channels 26a and 28a which communicate with cylinder ports 20a and 22a, respectively. Both of these channels also communicate with the inlet port 16a. Annular channel 26a communicates with the inlet port via passages 202 and 204 and a first poppet valve 206 while annular channel 28a communicates with the inlet port via passage 202 and a second poppet valve 208. The bore 14a of the housing member is provided with a central annular channel 32a which communicates with the outlet port 18a via passage 36a. The two poppet valves 206 and 208 are identical and therefore only one will be described. Each includes a valve seat 44a, a ball valve 46a with a valve stem 48a welded thereto, and a preloaded spring 50a urging said ball valve against said valve seat. Both of the poppet valves are hydraulically balanced as previously described in the first embodiment, communication being established between chamber 45a and annular channel 26a via passage 47a. Ramp or cam surfaces 210 and 212 which are formed on valve spool 24a on each side of the central land 56a are capable of unseating one or the other of the ball valves 64a, depending on the direction of movement of the valve member 24a. By using predetermined ball sizes and cone ramp angles it is possible to get excellent metering.

Reaction chambers 62a and 64a communicate with the cylinder ports 22a and 20a via passages 66a and 68a. Unequal reaction areas may be used in the reaction chambers in the manner shown and described in S. I. MacDuff's application No. 264,814, now Patent No. 2,757,748. Furthermore, reaction limiting may also be incorporated by using regulating valves as shown and described in S. I. MacDuff's application No. 457,836, now Patent No. 2,930,361. These features may also be incorporated in the embodiment of Figure 1.

The valve member 24a is operatively connected to the ball stud 74a for sliding movement in the bore through an assembly of parts which is similar to that described in the embodiment of Figure 1. The description of these parts will, therefore, not be repeated.

Figure 2 shows the double poppet valve version of the control valve in its neutral position. In this position fluid flow from the inlet port 16a to annular channel 26a is prevented by poppet valve 206 and flow from the inlet port to annular channel 28a by poppet valve 208. The central annular channel 32a is connected to return in this embodiment. In the neutral position annular channel 32a is in communication with the cylinder ports 20a and 22a via annular channels 26a and 28a, thereby permitting free flow of fluid between the chambers of a power cylinder (not shown). Movement of the valve spool 24a to the left will cause cam surface 210 to unseat ball valve 46a from its valve seat 44a. Pressurized fluid will then be transmitted from an accumulator to the cylinder port 20a via inlet port 16a, passages 202 and 204, poppet valve 206 and annular channel 26a. However, before the poppet valve is opened, the central land 56a will close off communication between annular channel 26a and the return port 18a in order to prevent the loss of power through the escape of pressure fluid. Movement of the valve spool to the right will cause cam surface 212 to open poppet valve 208, thereby permitting pressurized fluid to flow to the cylinder port 22a in the manner previously described.

Figure 3 shows a hydraulically unbalanced poppet valve, without a valve stem attached to the ball valve, which may be used in place of the poppet valves shown in Figures 1 and 2. The valve is similar to the others in that it has a valve seat 44c, a ball valve 46c and a preloaded spring 50c urging the ball valve against its valve seat.

Figure 4 shows a portion of another double poppet valve embodiment which uses poppet valve actuators of the type shown in Figure 1 in place of the cam surface actuators shown in Figure 2. The porting of this embodiment is identical with that of Figure 2. Therefore, discussion will be limited to the actuating members and the manner in which they operate. The T-section collar button actuators 52d and 53d ride in recesses 402 and 404 of annular channels 26d and 28d. These channels communicate with the cylinder ports in the same manner as shown in Figure 2. The ends 406 and 408 of the actuators are positioned in the recesses so that movement of the valve member 24d to the right or left will actuate only one of the poppet valves 410 or 412. Thus upon movement of the valve member to the left, shoulder 414 of recess 402 will pick up end 406 of valve actuator 52d causing poppet valve 410 to open. However, shoulder 416 of recess 404 is spaced so that it will not make contact with the end 408 of actuator 53d. Movement to the right will cause shoulder 418 to pick up end 408 of valve actuator 53d thereby opening poppet valve 412. Poppet valve 410 will remain closed since shoulder 420 of recess 402 is also spaced so that it will not make contact with the end 406 of actuator 52d. Shoulders 414 and 418 should be located so that the central land 56d closes off one of the cylinder ports to return before one of the poppet valves opens.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A closed center control valve comprising a housing member having a bore therein, a valve member slidable in opposite directions from a normally neutral position within said bore, an inlet port, an outlet port two working ports, two poppet valves between said inlet port and the bore of said housing, a central land formed on said said valve member, and cam surfaces formed on said valve member on each side of said central land, said cam surfaces opening one or the other of said poppet valves upon movement of said valve member.

2. A valve comprising inner and outer telescopically arranged members having normally neutral positions with respect to each other, one of said members being shiftable in either direction from its neutral position for controlling flow, an inlet port, an outlet port, two working ports, annular channels formed on said inner member by a plurality of lands, reaction chambers located at each end of said inner member, passages connecting the chambers to said annular channels, a plurality of poppet valves within said outer member communicating said inlet port with said annular channels, and cam surfaces formed on said inner member between said lands, said cam surfaces opening one of said poppet valves upon movement of said inner member.

3. A closed center control valve comprising a housing member having a bore therein, a valve member slidable in opposite directions from a normally neutral position within said bore, an inlet port, an outlet port, two working ports, two annular channels formed on said valve member by a central land and two outer lands, a first poppet valve between the inlet port and one of said annular channels, a second poppet valve between the inlet port and the other of said annular channels, said poppet valves including a valve seat, a ball valve, and a preloaded spring, a first cam surface formed on said valve member between the central land and one of said outer lands for opening said first poppet valve upon movement of said valve member in one direction, and a second cam surface formed on said valve member between the central land and the other of said outer lands for opening said second poppet valve upon movement of said valve member in the other direction.

4. A closed center control valve comprising a housing member having a bore therein, a valve member slidable in opposite directions from a normally neutral position within said bore, an inlet port, an outlet port, two working ports, two annular channels formed on said valve member by a central land and two outer lands, a first poppet valve between the inlet port and one of said annular channels, a second poppet valve between the inlet port and the other of said annular channels, said poppet valves including a valve seat, a ball valve, and a preloaded spring, a first valve actuating member connected to said valve member for opening said first poppet valve upon movement of said valve member in one direction, and a second valve actuating member connected to said valve member for opening said second poppet valve upon movement of said valve member in the other direction.

5. A closed center control valve comprising a housing member with a bore therein, a valve member slidable in opposite directions from a normally neutral position within said bore, an inlet port, an outlet port, two working ports, two annular channels formed on said valve member by a central land and two outer lands, said annular channels communicating with said inlet port and said working ports, a first poppet valve between the inlet port and one of said annular channels, a second poppet valve between the inlet port and the other of said annular channels, a third annular channel formed in said housing, said third annular channel communicating with said outlet port and said two annular channels formed on said valve member, actuating means located between the central land and one of said outer lands for opening said first poppet valve upon movement of said valve member in one direction, and second actuating means located between the central land and the other of said outer lands for opening said second poppet valve upon movement of said valve member in the other direction.

6. A closed center control valve comprising a housing member with a bore therein, a valve member slidable in opposite directions from a normally neutral position within said bore, an inlet port, an outlet port, two working ports, two annular channels formed on said valve member by a central land and two outer lands, said annular channels communicating with said inlet port and said working ports, a first poppet valve between the inlet port and one of said annular channels, a second poppet valve between the inlet port and the other of said annular channels, a third annular channel formed in said housing, said third annular channel communicating with said outlet port and said two annular channels formed on said valve member, first actuating means located on said valve member for opening said first poppet valve upon movement of said valve member in one direction, and second actuating means located on said valve member for opening said second poppet valve upon movement of said valve member in the other direction.

7. A closed center control valve comprising a housing member having a bore therein, a valve member slidable in opposite directions from a normally neutral position within said bore, an inlet port, an outlet port, two working ports, two annular channels formed on said valve member by a central land and two outer lands, a first poppet valve between the inlet port and one of said annular channels, a second poppet valve between the inlet port and the other of said annular channels, a first valve actuating member connected to said valve member for opening said first poppet valve upon movement of said valve member in one direction, and a second valve actuating member connected to said valve member for opening said second poppet valve upon movement of said valve member in the other direction.

References Cited in the file of this patent

UNITED STATES PATENTS

| | | |
|---|---|---|
| 871,157 | Andrews | Nov. 19, 1907 |
| 1,158,204 | Grandstaff | Oct. 26, 1915 |
| 2,503,397 | Valley | Apr. 11, 1950 |
| 2,612,375 | Worthington | Sept. 30, 1952 |
| 2,719,511 | Presnell | Oct. 4, 1955 |

FOREIGN PATENTS

| | | |
|---|---|---|
| 181,402 | Great Britain | June 12, 1922 |